Jan. 22, 1952    G. R. BROWN    2,583,465
FISHLINE REEL
Filed Feb. 8, 1947
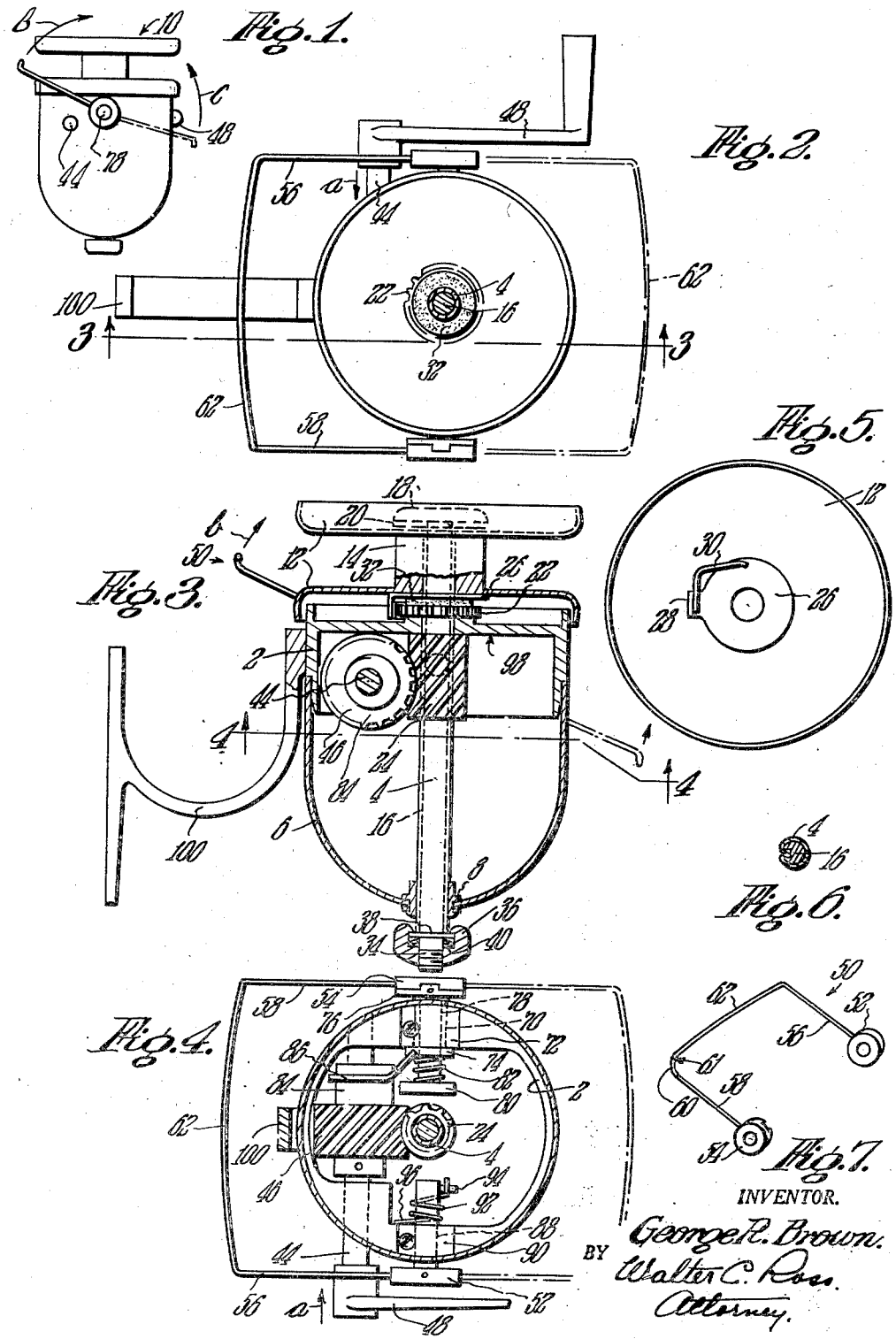
INVENTOR.
George R. Brown.
BY Walter C. Ross.
Attorney.

Patented Jan. 22, 1952

2,583,465

UNITED STATES PATENT OFFICE 2,583,465

FISH LINE REEL

George R. Brown, Springfield, Mass.

Application February 8, 1947, Serial No. 727,395

4 Claims. (Cl. 242—84.4)

This invention relates to reels for fish lines or the like.

The principal object of the invention is the provision of a fish line reel which is adapted for association with a fish rod or pole and is constructed and arranged in a novel manner. A line may be cast or otherwise extended from the drum of the reel, and when strain on the line occurs as when the line is taken by a fish, the drum is rotated in a paying out direction and a signal is actuated thereby, such as a clicking sound.

The drum is manually rotated for taking in and winding up line and a guide device is provided which automatically traverses the drum during its rotation for guiding and serving the line onto the drum.

When the line is to be extended from the drum, the guide is moved from the guiding to a nonguiding position and when the drum is to be rotated for winding up the line, the guide is automatically moved to a line guiding position.

Various novel features and advantages of the novel construction and arrangement will be hereinafter more fully referred to in connection with the accompanying description of the invention in the form at present preferred. It will be understood that various changes and modifications may be made in the form of the apparatus without departing from the spirit and scope of the invention.

In the drawings:

Fig. 1 is a small scale side elevational view of a reel construction embodying the novel features of the invention with the bracket thereof omitted;

Fig. 2 is a plan view of the reel shown in Fig. 1 with the line drum removed therefrom;

Fig. 3 is a sectional elevational view on the line 3—3 of Fig. 2;

Fig. 4 is an inverted sectional plan view on the line 4—4 of Fig. 3;

Fig. 5 is an inverted plan view of the line drum;

Fig. 6 is a cross sectional view through the central drive tube and shaft at the lower end of the central drive tube and shaft to show one manner of fixing them together; and Fig. 7 is a small scale perspective view of the line guide of the reel.

Referring now to the drawings more in detail, the invention will be fully described.

A body 2 is provided which has a central tubular drum driving member 4 rotatable therein. A cup shaped closure member 6 is arranged at its upper end to engage the body 2 and it may be releasably secured thereto by screws or in any other desired manner. The lower end of the closure is provided with a bearing 8 in which the tubular driving member 4 is rotatable.

A drum 10 has upper and lower spaced flanges 12 which are secured in some suitable manner to a central hub 14 which is rotatable on the central tube 4. A central shaft 16 is movable axially in the tube 4 and a head 18 on the upper end thereof bears on a yieldable washer 20 which in turn bears on the upper flange of the drum. A drum driving member 22 having a serrated peripheral edge is fixed to the tube 4 in some suitable manner. A portion of tube 4 is indented into an elongated groove of shaft 16 as shown in Fig. 6 whereby said shaft and tube are relatively slidable and relatively nonrotatable. A gear member 24 is also fixed to the tube 4.

A member 26 (see Fig. 5) is secured to the lower flange 12 of the drum 10 and it has a tongue 28 to which is secured one end of a yieldable member 30. The yieldable member 30 is constructed and arranged so that when the tube 4 and member 22 are driven in the winding direction the serrations of the member 22 are engaged by the member 30 but member 30 can click past the serrations. When the drum is rotated in an opposite direction, as when a line extending therefrom is pulled by a fish which has taken the hook on the line or when the drum lags behind the tube 4 in winding, the member 30 clicks past the serrations of the member 22 thereby providing a signal to indicate that there is a strain on the line. A yieldable washer 32 is disposed between the member 22 and member 26. The washers 32 and 22 provide a driving connection between shaft 16, gear 22 and the drum.

The lower end 34 of the central shaft 16 is threaded, as shown, and a nut 36 is in engagement therewith. A washer 38 on the shaft abuts the lower end of the central tube 4 and a spring washer 40 is provided below the washer 38. The washers 20 and 32 are more or less yieldable and may be of fibrous material. The nut 36 may be adjusted on the screw 16 in such a manner that the said washers 20 and 32 apply a drag to the drum to retard the rotation of said drum in the paying-out direction.

A transverse shaft 44 is rotatable in the body 2 and is movable axially therein for the purpose to be described. A gear 46 fixed thereto is in mesh with the gear 24 which is fixed to the tube 4 and a crank 48 is fixed to the outer end of said shaft 44. As the crank is rotated in one direction to rotate the shaft 44, the central tube 4 is rotated through the gears 24 and 46 so that the drum 10 is rotated in a take-up direction by means of the member 22 and washers 20, 32 and the friction of yieldable member 30 on gear 22. The crank is rotated in one direction to wind up the line on the drum, while the drum is free to rotate against the drag of washers 22 and 32 in an opposite direction on the tube as the line is subjected to a pulling force and in so rotating the member 30 as aforesaid snaps over the serrations of the member 22 and produces a signal or click.

A guide 50 includes hubs 52 and 54 and a U-shaped member having side arms 56 and 58 secured thereto. At the end of the side arm 58 an upwardly extending portion 60 is connected by a curved portion 62 to the arm 56 as shown in Fig. 7.

A bushing 70 is oscillatable in a bearing 72 secured in the body (see Fig. 4) which has inner and outer ends 74 and 76 and a shaft 78 is oscillatable and slidable in the bushing. The hub 54 of the guide member is fixed to the outer end of the shaft 78 and said hub and part 76 of the bushing are provided with interfitting projections and slots, as shown, forming a clutch.

The inner end of the shaft 78 is provided with a head 80 and a compression spring 82 is disposed between 74 and 80 to urge said shaft 78 and hub 54 inwardly. A hub 84 of the gear 46 is eccentrically disposed relative to the axis of said gear and a fork 86 secured to the part 74 straddles the said hub so that as the gear and hub rotate the member 74 and thereby the member 76 are oscillated.

As previously stated, the shaft 44 is slidable and as it is moved inwardly in the direction of the arrow $a$ the gear 46 engages the head 80 of the shaft 78 to move the hub 54 of the guide away from the part 76 and disengage it from said part 76.

A shaft 88 is oscillatable in a bearing 90 fixed to the body 2 and the hub 52 of the guide is secured to the outer end thereof. A coil spring 92 around the shaft 88 has one end hooked over a pin 94 fixed to said shaft 88 while the other end 96 of the spring abuts the wall 98 of the body.

The guide 50 is swingable from the guiding position, shown in full lines in Figs. 1, 2 and 3, in the direction of the arrow $b$ to the non-guiding position shown by dot-dash lines. It is desired to have the guide in said position when the device is secured to a rod and the line is to be cast or extended from the drum.

To accomplish this, the shaft 44 is moved inwardly by pressing on the lever 48 in the direction of the arrow $a$ so that the gear 46 engages the part 80 of the shaft 78 to move the hub 54 of the guide outwardly and disengage it from the part 76.

The guide then is freely swung manually downwardly to the non-guiding position mentioned and when the shaft 44 is released the spring 82 acts on the part 80 of the shaft 78 to move said shaft inwardly so that parts 54 and 76 are in clutching engagement with the guide in non-guiding position.

When the line extended from the reel, when there is a strain thereon, as when the line is taken by a fish, the drum is rotated in a paying-out direction so that the member 30 clicks past the serrations of member 22 to produce a signal. When it is desired to take in or wind up the line, endwise movement of the shaft 44 or crank causes the gear 46 to engage part 80 of shaft 78 and move it outwardly thereby disengaging parts 54 and 76. The spring 92 then returns the guide to the guiding position, shown in full lines. That is, the end members 62 of the guide move in the direction of the arrow $c$, Fig. 1, when the members 54 and 76 are disengaged.

The crank 48 is rotated to rotate the drum in the take-up direction through the gears 46 and 24 and as the shaft 44 is rotated the part 74 is oscillated by means of the cam hub 84 of the gear 46 and fork 86. The parts 54 and 76 being in clutching engagement, the guide is oscillated up and down in such a manner that the member 62 of the guide is moved in a vertical plane at a side of the drum to serve the line onto the drum in the desired manner.

When the guide is in a non-guiding position, the line extends from the drum free of the guide. When the guide is swung by the spring 92 to its guiding position at the opposite side of the drum, the line is disposed beneath the transverse part 62 of the guide and in the jointure of the parts 62 and 60, indicated by 61 in Fig. 7 which more or less confines the line for guiding it up and down onto the drum. The part 62 of the guide extends between members 56 and 58 in more or less curved angular relation so that the line tends to slide towards the jointure 61.

A bracket such as 100 of any suitable form may be secured to the body which may be attached to any desired support such as a rod or the like.

What it is desired to claim and secure by Letters Patent of the United States is:

1. Fish line reel apparatus comprising in combination, a hollow housing including a lower member closed at its lower end and an upper head member closing the upper end thereof; a central tube extending through and rotatable in said closure, a central drive shaft extending through and relatively slidable in said tube, means holding said tube and shaft against relative rotation, a line drum carried by said shaft above said head, a drum driving member fixed to said tube, a yieldable friction washer between said drum and driving member, screw means on the lower end of said shaft acting on the lower end of said tube to urge the drum against said washer which acts as a drag driving connection between said drum and tube, a crank shaft extending from said closure and being rotatable and reciprocable relative thereto, gears on and connecting said crank shaft with said tube disposed within said closure, a line guide swingable relative to said closure between non-guiding and guiding positions, means urging said guide from non-guiding to guiding position, means releasably holding said guide in non-guiding position, and engageable connections carried by said holding means and crank shaft operable by reciprocation of said crank shaft in one direction to release said holding means.

2. Fish line reel apparatus comprising in combination, a hollow housing including a lower member closed at its lower end and an upper head member closing the upper end thereof, a central tube extending through and rotatable in said closure, a central drive shaft extending through and relatively slidable in said tube, means holding said tube and shaft against relative rotation, a line drum carried by said shaft above said head, a drum driving member fixed to said tube, a yieldable friction washer between said drum and driving member, screw means on the lower end of said shaft acting on the lower end of said tube to urge the drum against said washer which acts as a drag driving connection between said drum and tube, a crank shaft extending from said closure and being rotatable and reciprocable relative thereto, gears on and connecting said crank shaft with said tube disposed within said closure, a line guide swingable relative to said closure between non-guiding and guiding positions, means urging said guide from non-guiding to guiding position, means releasably holding said guide in non-guiding position, engageable connections carried by said holding means and crank shaft operable by reciprocation of said crank shaft in one direction to release said holding means, and engageable signal means carried by the drum and driving member operable to emit a signal as the drum rotates in one direction.

3. Fish line reel apparatus comprising in combination, a hollow housing including a lower member closed at its lower end and an upper head member closing the upper end thereof, a central tube extending through and rotatable in said closure, a central drive shaft extending through and relatively slidable in said tube, means holding said tube and shaft against relative rotation, a line drum carried by said shaft above said head, a drum driving member fixed to said tube, a yieldable friction washer between said drum and driving member, screw means on the lower end of said shaft acting on the lower end of said tube to urge the drum against said washer which acts as a drag driving connection between said drum and tube, a crank shaft extending from said closure and being rotatable and reciprocable relative thereto, gears on and connecting said crank shaft with said tube disposed within said closure, a hollow bushing member oscillatable in one side of said closure, a first guide shaft oscillatable and slidable therein, a second guide shaft oscillatable in an opposite side of said closure, a clutch member fixed to said bushing and a clutch member engageable therewith fixed to said first guide shaft, a guide member in the form of a U having opposite end portions secured to said second-named clutch member and to said second guide shaft, spring means urging said second shaft in one direction to move the guide from non-guiding to guiding position, spring means urging said first guide shaft longitudinally in one direction to engage said clutch members for releasably holding the guide in non-guiding position against the action of said first-named spring means, said gear on said crank shaft engageable with said first guide shaft as the said crank shaft is reciprocated in one direction whereby to disengage said clutch members so that the guide when held thereby in non-guiding position is swung to guiding position by said first-named spring means.

4. Fish line reel apparatus comprising in combination, a hollow housing including a lower member closed at its lower end and an upper head member closing the upper end thereof, a central tube extending through and rotatable in said closure, a central drive shaft extending through and relatively slidable in said tube, means holding said tube and shaft against relative rotation, a line drum carried by said shaft above said head, a drum driving member fixed to said tube, a yieldable friction washer between said drum and driving member, screw means on the lower end of said shaft acting on the lower end of said tube to urge the drum against said washer which acts as a drag driving connection between said drum and tube, a crank shaft extending from said closure and being rotatable and reciprocable relative thereto, gears on and connecting said crank shaft with said tube disposed within said closure, a hollow bushing member oscillatable in one side of said closure, a first guide shaft oscillatable and slidable therein, a second guide shaft oscillatable in an opposite side of said closure, a clutch member fixed to said bushing and a clutch member engageable therewith fixed to said first guide shaft, a guide member in the form of a U having opposite end portions secured to said second-named clutch member and to said second guide shaft, spring means urging said second shaft in one direction to move the guide from non-guiding to guiding position, spring means urging said first guide shaft longitudinally in one direction to engage said clutch members for releasably holding the guide in non-guiding position against the action of said first-named spring means, said gear on said crank shaft engageable with said first guide shaft as the said crank shaft is reciprocated in one direction whereby to disengage said clutch members so that the guide when held thereby in non-guiding position is swung to guiding position by said first-named spring means, and engageable means carried by said gear on the crank shaft and bushing operable when said clutch members are engaged to oscillate said bushing back and forth whereby to swing said guide back and forth.

GEORGE R. BROWN.

REFERENCES CITED

The following references are of record in the file of this patent:

FOREIGN PATENTS

| Number | Country | Date |
|---|---|---|
| 363,597 | Great Britain | Dec. 24, 1931 |
| 379,371 | Great Britain | Aug. 29, 1932 |
| 833,556 | France | July 25, 1938 |